Aug. 26, 1958 W. S. BRINK 2,848,805
METHOD OF MAKING A DROP CENTER ONE PIECE TUBELESS TIRE RIM
Filed Aug. 12, 1955
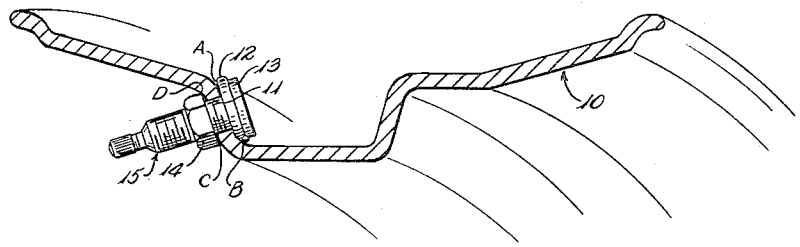
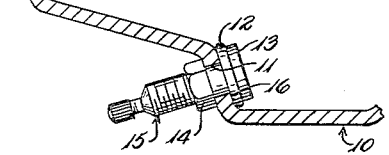
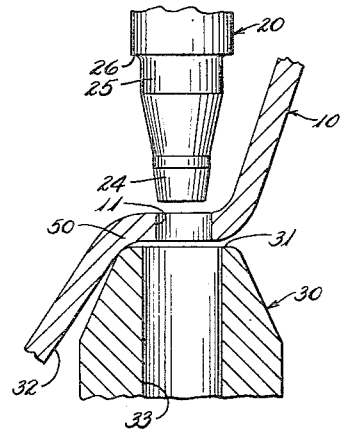
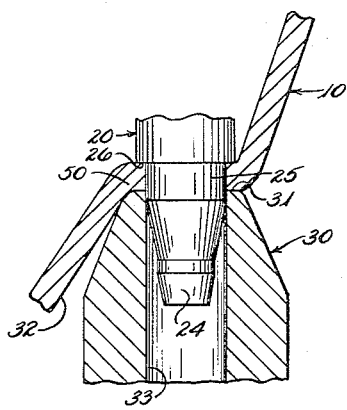
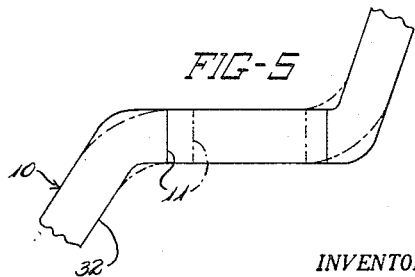
INVENTOR.
WINFIELD S. BRINK
BY
W. A. Fraser
ATTY-

United States Patent Office 2,848,805
Patented Aug. 26, 1958

2,848,805

METHOD OF MAKING A DROP CENTER ONE PIECE TUBELESS TIRE RIM

Winfield S. Brink, Akron, Ohio, assignor to The Firestone Tire & Rubber Company, Akron, Ohio, a corporation of Ohio Application August 12, 1955, Serial No. 528,055

1 Claim. (Cl. 29—545)

This invention relates to a method of making a truck tire drop center rim adapted for use with tubeless tires, and more particularly it relates to rims of a one piece type. Such rims have come into general use and when they are used in combination with a tubeless truck tire, it is necessary to seal the rim valve stem opening about the inflating valve stem so that the tire inflationary air cannot escape at that point. The inflating stem presently used requires a 5/8 inch round hole located in a slanting side of the well of the rim. The shape and size of the area of the rim where the stem is located is such, in the prior art rims, that it was impossible to locate the rim stem hole so that a flat surface was present on opposite sides of the wall thickness of the well adjacent the valve stem hole. Such flat area was desirable, if not necessary, in forming an air tight contact of the head of the valve stem with the rim adjacent the valve stem hole. Heretofore the slanting surface of the opposite sides of the slanting portion of the rim well made it difficult to locate and hold a punch and die, employed to form the stem opening, in the desired location because of the tendency of these members to slip or shift. If means were provided to hold the rim in position to flatten the rim about the stem valve hole, the same could be done by a cold forging or coining operation but this work would occur at a critical stress point of the rim leaving a localized stress area at the edge of the forging and for that reason cold forging or coining as heretofore done is not desirable. In truck rims there is a sufficient thickness of metal to permit milling the desired flat area of the valve stem hole but this method is very expensive and has the fault of cold forging mentioned, namely, creates a localized stress area.

The present invention employs a method of forming an inflating valve stem hole in a one piece drop center truck tire rim and flattening the area thereabout by a punching operation which method will be understood from the following description and by reference to the drawings wherein:

Fig. 1 is a fragmentary cross-sectional view of a rim to which the present invention relates, the rim being shown with the inflating valve stem assembled in operative position therewith as it would appear before the area of the surface of the rim adjacent the valve stem has been flattened;

Fig. 2 is the same as Fig. 1 except the rim is shown with the area about the valve stem hole shown flattened on both sides of the rim;

Fig. 3 is an enlarged fragmentary section of the rim of Fig. 1 shown with a punch and die in their initial operative position for finishing the punching of a rim valve stem hole;

Fig. 4 is the same as Fig. 3 except the punch, die and rim portion are shown in their relative positions at the completion of forming the rim valve stem hole and flattening the rim thereabout; and Fig. 5 is an enlarged diagrammatic view illustrating the change in contour of the rim, the contour shown in Fig. 3 being indicated by the broken line.

The rim 10, shown in Fig. 1, is made in the usual manner of hot rolling the section, forming into sectional contour, cutting to length, circling and welding. It will be seen that the unaltered contour of a rim is of such uneven contour, adjacent a rim valve stem hole 11, that a washer 12, between a head 13, of an inflating stem 15 and the rim is not supported by the rim at point "A." Also that the diametrically opposite edge of washer 12 is supported by the rim at "B" in a position that cocks said washer and head relative to the axis of hole 11. It will also be seen that a contact edge of a lock nut 14 overhangs said rim at "C" and that the nut's diametrically opposite edge at "D" contacts the rim so as to cock the washer relative to the axis of hole 11. The cocked relation of washer 12, head 13 and nut 14 as just described is undesirable since the washer 12 functions to seal the space between stem 15 and the edges of hole 11. The surface area about valve stem hole 11 as shown in Fig. 2 has been flattened, in accordance with the present invention, and illustrates how the flat surface permits washer 12, head 13 and nut 14 to seat without cocking.

Applicant's means and method of forming hole 11 and a flat area 16 about and adjacent hole 11 comprises, first, the step of punching or otherwise forming the hole 11 smaller than its ultimate size, the small hole being in the area of the rim well that is flat. Next, by means of a tapered punch 20 and supporting die 30, hole 11, which for example may be 7/16" in diameter, is enlarged to its finished size of 5/8" in diameter and the surface of the rim, about the hole is flattened as will now be described.

Hole 11, before its enlargement, is located somewhat off center toward the center of the rim from the hole's finished position. The rim contact portion 31 of die 30 is flat and it will be seen by reference to Fig. 3 that the outer radial edge of this portion of the die comes into contact with the slanting surface 32 of rim 10 and this die edge must have sufficient strength to withstand the strain to which it is subjected. Before the present invention it was impossible to get sufficient thickness of metal in the rim contact or support edge 31 of the die to support the rim during the punching operation. By initially forming a small hole and offsetting it as described above, it is possible for applicant to add considerable thickness to the supporting edge of the die and thereby to provide sufficient strength thereto for the successful operation of the invention as follows.

With the rim 10, punch 20 and die 30 in position, as shown in Fig. 3, the die is forced into hole 11 and a center hole 33 of the die. Punch 20 is formed with a tapered end 24, the lower and smaller end of which freely enters hole 11 as originally formed. The enlargement of hole 11 forces the metal away from the edges of the hole, one result of which is to push the area 50 of critical stress away enough to minimize the cold forging effect at the side of hole 11. The movement of the metal adjacent the valve hole is shown diagrammatically in Fig. 5, the contour of the rim being changed from the broken to the solid line. The piercing drift of taper 24 of the punch merges into a cylindrical portion 25 for a short distance and the punch has a flat shoulder 26 at the end of the cylindrical portion removed from said tapered portion. The flat shoulder portion of the punch is complementary to the flat edges 31 of die 30. When the punch and die are adjusted to proper depth, as shown in Fig. 4, the required enlargement of hole 11 and a final defining of the flat required to seat washer 12, head 13 and nut 14 as shown in Fig. 2 is provided.

It will now be seen that applicant provides a novel and economical method whereby a valve stem hole may be located at the required position in the sloped side of the well of a drop center rim with the necessary modification of the area of the rim about said hole to provide flat surfaces for proper seating of sealing members.

The detailed description of the particular embodiment of the invention illustrated and described herein is not to be construed as limiting the invention thereto. The invention includes all features of patentable novelty residing in the foregoing description and the accompanying drawing.

What is claimed is:

The method of forming a valve stem opening in a drop center rim having a flat wall portion of limited extent merging by curved portions into adjacent angularly extending rim surfaces, which comprises forming a hole through said wall portion intermediate said curved portions, enlarging said hole by radial expansion while reforming said curved portions adjacent said hole by appreciably reducing the radii of curvature thereof.

References Cited in the file of this patent

UNITED STATES PATENTS

| | | |
|---|---|---|
| 1,040,265 | Bosler | Oct. 8, 1912 |
| 2,191,916 | Schreiber | Feb. 27, 1940 |
| 2,587,470 | Herzegh | Feb. 26, 1952 |
| 2,608,235 | Wyman | Aug. 26, 1952 |